(12) United States Patent  
Hayon et al.

(10) Patent No.: US 6,711,244 B2  
(45) Date of Patent: Mar. 23, 2004

(54) CUSTOMIZABLE SCRIPTING BASED TELEPHONE SYSTEM AND TELEPHONE DEVICES

(75) Inventors: Ralph Hayon, Riverside, NJ (US); Avner Taieb, Petach Tikva (IL); Effi Shiri, Petach Tikva (IL); Nirit Beglaubter, Petach Tikva (IL)

(73) Assignee: Telrad Connety Ltd, Rosh A'ain (IL)

( * ) Notice: Subject to any disclaimer, the term of this patent is extended or adjusted under 35 U.S.C. 154(b) by 345 days.

(21) Appl. No.: 09/726,047

(22) Filed: Nov. 30, 2000

(65) Prior Publication Data

US 2002/0064153 A1 May 30, 2002

Related U.S. Application Data

(60) Provisional application No. 60/168,395, filed on Dec. 2, 1999.

(51) Int. Cl.[7] ............................................... H04M 11/00
(52) U.S. Cl. ................................................... 379/90.01
(58) Field of Search ........................ 379/90.01, 93.17, 379/93.19, 93.21, 93.23, 93.25, 93.24, 100.01; 370/352, 356

(56) References Cited

U.S. PATENT DOCUMENTS

| | | | | |
|---|---|---|---|---|
| 5,917,905 A | * | 6/1999 | Whipple et al. | 379/93.17 |
| 5,923,736 A | * | 7/1999 | Shachar | 379/93.17 |
| 5,937,041 A | * | 8/1999 | Cardillo, IV et al. | 379/90.01 |
| 6,108,406 A | * | 8/2000 | Mitchell et al. | 379/90.01 |
| 6,122,349 A | * | 9/2000 | Kredo et al. | 379/90.01 |
| 6,343,116 B1 | * | 1/2002 | Quinton et al. | 379/90.01 |

* cited by examiner

Primary Examiner—Stella Woo
(74) Attorney, Agent, or Firm—Mark M. Friedman (57) ABSTRACT

A scripting based network telephonic system and device for connection to a packet-switched network, preferably an IP network, particularly for use as a telephone, as its name suggests. The device preferably features a display screen for displaying video information, such as a GUI (graphical user interface) for example. More preferably, the display screen is integrated with a touch screen. Additionally or alternatively, function buttons are also provided for receiving user input. The system and device also provides real time language based scripting software functionality which enables the device to be flexibly customized according to the request of the user.

1 Claim, 6 Drawing Sheets

Overall SETT Block Diagram

FIG.1: Overall SETT Block Diagram

FIG.2: Main PCB

FIG.3: Keypad PCB Block Diagram

FIG.4: Ethernet and QoS Block

CUSTOMIZABLE SCRIPTING BASED TELEPHONE SYSTEM AND TELEPHONE DEVICES

This application claims priority from U.S. Provisional Patent Application No. 60/168,395 filed Dec. 2, 1999 and which is incorporated herein by reference.

FIELD AND BACKGROUND OF THE INVENTION

The present invention relates to a telephone system and telephone devices which operate according to language-based scripts that load and run in real time within the telephone system and devices. This allows the system to be easily customized in function by modifying and/or adding new script language and loading these scripts into the system. Telephone devices connected to the server over a network detect new and updated scripts and load them for execution within the telephone. A particular example of such a system are IP based telephones that run the HTML (Hypertext Markup Language) language to control the telephone's graphical display and incorporate a script-based API (Application Programming Interface) that allows the telephone's functions to be directly controlled from a single script containing both HTML and telephone device API commands executing on the telephone. Such a system is optimally operated over a data network, where voice data in the form of packets is used for telephone services and data oriented scripts are used to control the telephone device, optionally allowing a single network and system to provide telephone services.

Current telephone systems, both analog and digital in a variety of settings, including both home and office use, are highly limited and fixed in functions that they provide. For example, the functionality of such telephones cannot be altered, but rather is limited to the factory-determined features.

A scripting based IP telephony system connects a scripting capable telephone to a scripting based server over a packet-switched network such as an IP (Internet Protocol) network, as its name suggests. These telephonic systems can receive data through such a network, and therefore can perform various voice mail and other telephonic functions through software on the connected server over the packet-switched network. Clearly, such a system is more flexible, since additional functions can be provided by adjusting the language based scripts that reside at the server and execute at both the server and telephone devices. Furthermore, such software can be customized by the user in order to perform these telephonic functions according to the request of the user. Thus, an IP scripting based telephony system provides a greater level of customization than non-scripting based telephones.

Additionally, even currently available IP telephony systems still lack flexibility, since the telephonic device which is connected to the dedicated server are not scripting language based. Although the software at the dedicated server can be customized, the same is not true of the telephonic device connected to the server. A more improved system would also include a flexible, customizable network telephonic device for receiving and transmitting the telephone calls. Unfortunately, such a system is not currently available.

There is thus a need for, and it would be useful to have, a network telephonic device which is itself flexible and customizable, and which is able to provide IP telephony services as part of an IP telephony system.

BRIEF DESCRIPTION OF THE DRAWINGS

The foregoing and other objects, aspects and advantages will be better understood from the following detailed description of a preferred embodiment of the invention with reference to the drawings, wherein.

SUMMARY OF THE INVENTION

The network telephonic device of the present invention is intended for connection to a packet-switched network, preferably an IP network, and is particularly preferred for use as a telephone, as its name suggests. The device preferably features a display screen for displaying text, graphical and video information, such as a GUI (graphical user interface) for example. More preferably, the display screen is integrated with a touch screen. Additionally or alternatively, function buttons are also provided for receiving user input. The device of the present invention also provides software scripting functionality which enables the device to be flexibly customized according to the request of the user, optionally and preferably through scripts provided as HTML pages and scripts such as JavaScripts.

Hereinafter, the term "network" refers to a connection between any two or more computational devices which permits the transmission of data.

Hereinafter, the term "computational device" includes, but is not limited to, an IP telephone having a real time operating system such as Vx Works (Wind River Ltd.); personal computers (PC) having an operating system such as DOS, Windows™, OS/2™ or Linux; Macintosh™ computers; computers having JAVA ™-OS as the operating system; graphical workstations such as the computers of Sun Microsystems™ and Silicon Graphics™, and other computers having some version of the UNIX operating system such as AIX™ or SOLARIS™ of Sun Microsystems™; or any other known and available operating system, or any device which can be connected to a packet switched network and which has an operating system. Hereinafter, the term "Windows™" includes but is not limited to Windows95™, Windows 3.x™ in which "x" is an integer such as "1", Windows NT™, Windows98™, Windows CE™ and any upgraded versions of these operating systems by Microsoft Corp. (USA).

Hereinafter, the term "Web browser" refers to any software program which can display text, graphics, or both, from Web pages on World Wide Web sites. Hereinafter, the term "Web page" refers to any document written in a mark-up language including, but not limited to, HTML (hypertext mark-up language) or VRML (virtual reality modeling language), dynamic HTML, XML (extended mark-up language) or related computer languages thereof, as well as to any collection of such documents reachable through one specific Internet address or at one specific World Wide Web site, or any document obtainable through a particular URL (Uniform Resource Locator). Hereinafter, the term "Web site" refers to at least one Web page, and preferably a plurality of Web pages, virtually connected to form a coherent group.

Hereinafter, the phrase "display a Web page" includes all actions necessary to render at least a portion of the information on the Web page available to the computer user. As such, the phrase includes, but is not limited to, the static visual display of static graphical information, the audible production of audio information, the animated visual display of animation and the visual display of video stream data.

Hereinafter, the word "management" of messages includes but is not limited to reading, viewing, listening, editing, composing, receiving, sending, deleting, filtering and sorting messages of any kind. As such the term "management" of messages can be used to refer to the management of voice messages, email messages, fax messages, electronic notes, voice messages and any other type of messages or data.

Hereinafter, the phrase "universal messages" includes but is not limited to voice messages, fax messages, email messages and electronic notes.

The method of the present invention could be described as a series of steps performed by a data processor, and as such could optionally be implemented as software, hardware or firmware, or a combination thereof. For the present invention, a software application could be written in substantially any suitable programming language, which could easily be selected by one of ordinary skill in the art. The programming language chosen should be compatible with the computational device according to which the software application is executed. Examples of suitable programming languages include, but are not limited to, C, C++ and Java.

DETAILED DESCRIPTION OF THE INVENTION

The network telephonic device of the present invention is intended for connection to a packet-switched network, preferably an IP network, and more preferably an Ethernet network. As such, the device of the present invention can be described as an Ethernet connected voice and data terminal, which is particularly preferred for use as a telephone, as its name suggests. The device preferably features a display screen, such as a VGA LCD for example, for displaying video information. More preferably, the display screen is integrated with a touch screen. Additionally or alternatively, function buttons are also provided for receiving user input. The network telephonic device executes at least one script for determining at least one function of the telephonic device, which enables the functioning of the telephonic device to be customized. A script contains commands to control both the display and call processes on the telephonic device.

The principles and operation of a network telephonic device according to the present invention may be better understood with reference to the drawings and the accompanying description, it being understood that these drawings are given for illustrative purposes only and are not meant to be limiting.

Figure 1:
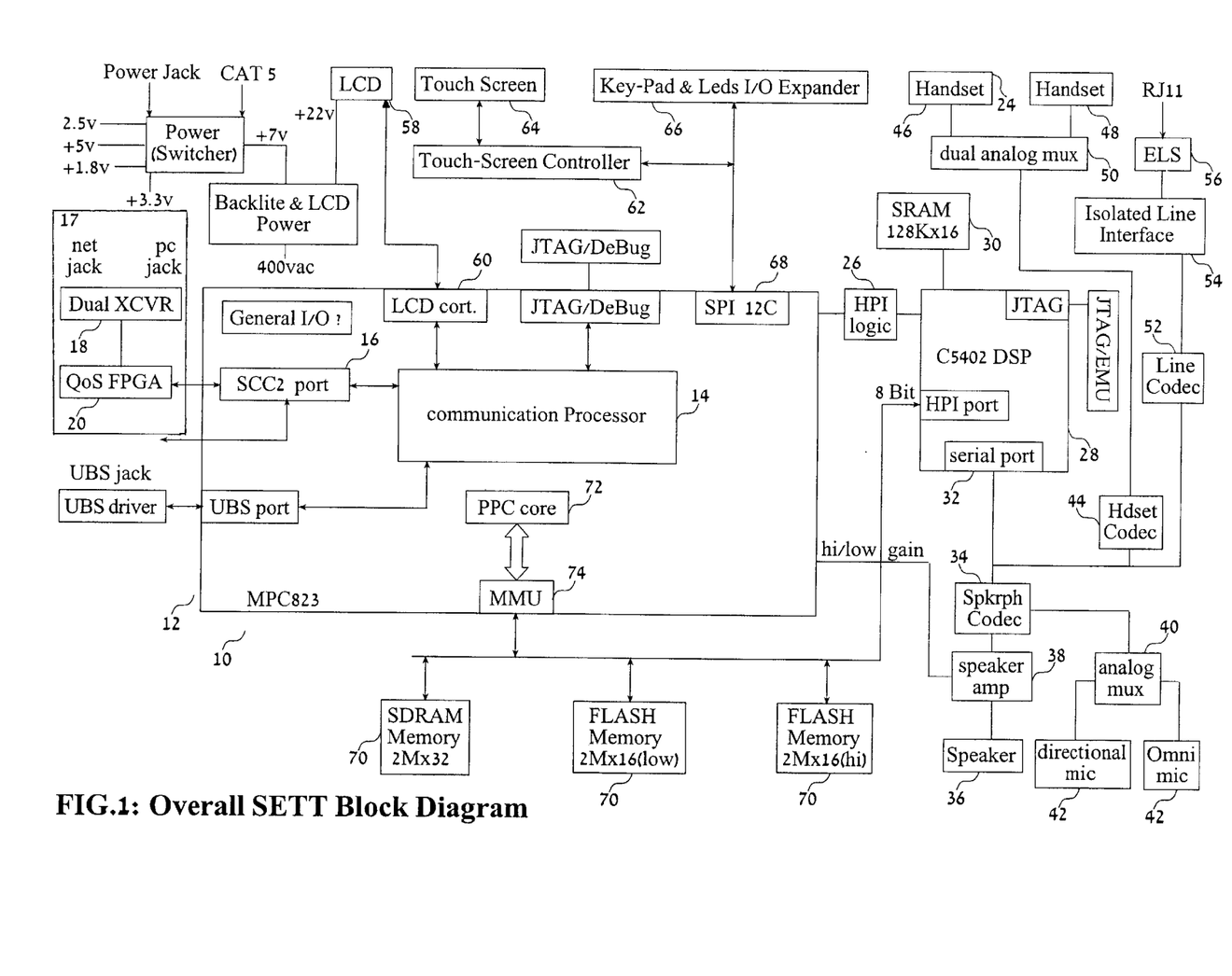
FIG. 1 is a schematic block diagram of an exemplary network telephonic device according to the present invention.

Referring now to the drawings, FIG. 1 is a schematic block diagram of an exemplary network telephonic device according to the present invention. As shown, the core of a network telephonic device 10 is a central processing chip 12, which is optionally and preferably a Motorola PowerPC MPC823. Central processing chip 12 preferably features a processing core 72 for performing the necessary computations, and a communication processor 14 for supporting communication with the remaining components of network telephonic device 10 for providing an interface with processing core 72, thereby enabling processing core 72 to control the functions of these components.

The first set of functions which is controlled by communication processor 14 includes communication with an outside network and/or other computational devices, for sending and receiving telephone call data. Communication processor 14 is connected to a SCC2 port 16, which in turn is connected to a network connection device 17, preferably including a dual transceiver 18 as shown which includes a connection to both the network and to a computer as shown. Network connection device 17 provides a connection to an Ethernet network according to the preferred embodiment of the present invention. More preferably, network connection device 17 includes a quality of service module 20 as shown, which is preferably implemented by an FPGA (Field Programmable Gate Array) or ASIC (Application Specific Integrated Circuit), for providing quality of service functions.

The second set of functions which is controlled by communication processor 14 includes the operation of the sound display through associated voice devices (such as telephonic handset 24, headset 48 or speaker 36 and microphone 42, which together form a speakerphone). Communication processor 14 is in communication with an HPI logic 26 which is preferably used to prevent exceeding the port speed, and which in turn is connected to a DSP chip 28. DSP chip 28 is optionally and preferably a TI 320LV5402 DSP (Texas Instruments Inc., USA). DSP chip 28 in turn is connected to a DSP memory 30, which is preferably SRAM as shown, for providing downloadable program space with one wait state with DSP chip 28 operating at 100 MHz. DSP chip 28 controls the operation of a plurality of CODEC's as shown, which are preferably TI 320ac02 CODEC's. The plurality of CODEC's is preferably connected to DSP chip 28 through a serial port interface 32 as shown.

A first CODEC is preferably a speaker CODEC 34 which is connected to the components for producing telephonic voice data and other audio signals through a speaker 36. Speaker CODEC 34 is connected to a speaker amplifier 38 which is in turn connected to speaker 36. Speaker CODEC 34 is also preferably connected to an analog MUX (multiplexer) 40, which receives audio signals from a plurality of microphones 42 and decides which signal should be passed.

A second CODEC is preferably a handset CODEC 44 for transmitting and receiving audio data, such as voice data, through a handset 46 and/or a headset 48. Handset CODEC 44 communicates with both components through a dual analog MUX 50.

A third CODEC is preferably a line CODEC 52 for communicating with an isolated line interface 54 and ELS (electronic line switch) 56. Isolated line interface 54 may optionally be used as a backup connection to the PSTN (public switched telephone network), for example for the case when the packet switched network goes down. ELS 56 enables isolated line interface 54 to be so isolated from the remainder of the circuitry, and is in communication with communication processor 14. Alternatively, ELS 56 can be used to connect an analog device, such as a facsimile machine, through network telephonic device 10 to the packet switched network.

The third set of functions which is controlled by communication processor 14 includes the operation of the visual display through an associated visual display 58, which is preferably a VGA LCD screen as shown. Communication processor 14 is connected to a visual display connector 60 for connecting to visual display 58 as shown. Since the visual display is preferably integrated with touch screen functionality, communication processor 14 is preferably in communication with a touch screen controller 62 for controlling the functions of a touch screen 64. Also, communication processor 14 is connected to an SPI I2C 68 which is a bus for communicating with touch screen controller 62 and to key-pad I/O 66.

Additional components which are controlled by processing core 72 include one or more memory devices 70 as shown, which may optionally include SDRAM memory and/or FLASH memory, for example. Processing core 72 is also connected to a MMU (memory management unit) 74 which may optionally also be used as a cache controller. MMU 74 is in turn connected to memory device(s) 70. Each memory device 70 is preferably used to hold software instructions for customizing the functionality of network telephonic device 10, as described in greater detail below. These software instructions are then operated by processing core 72.

Figure 2:
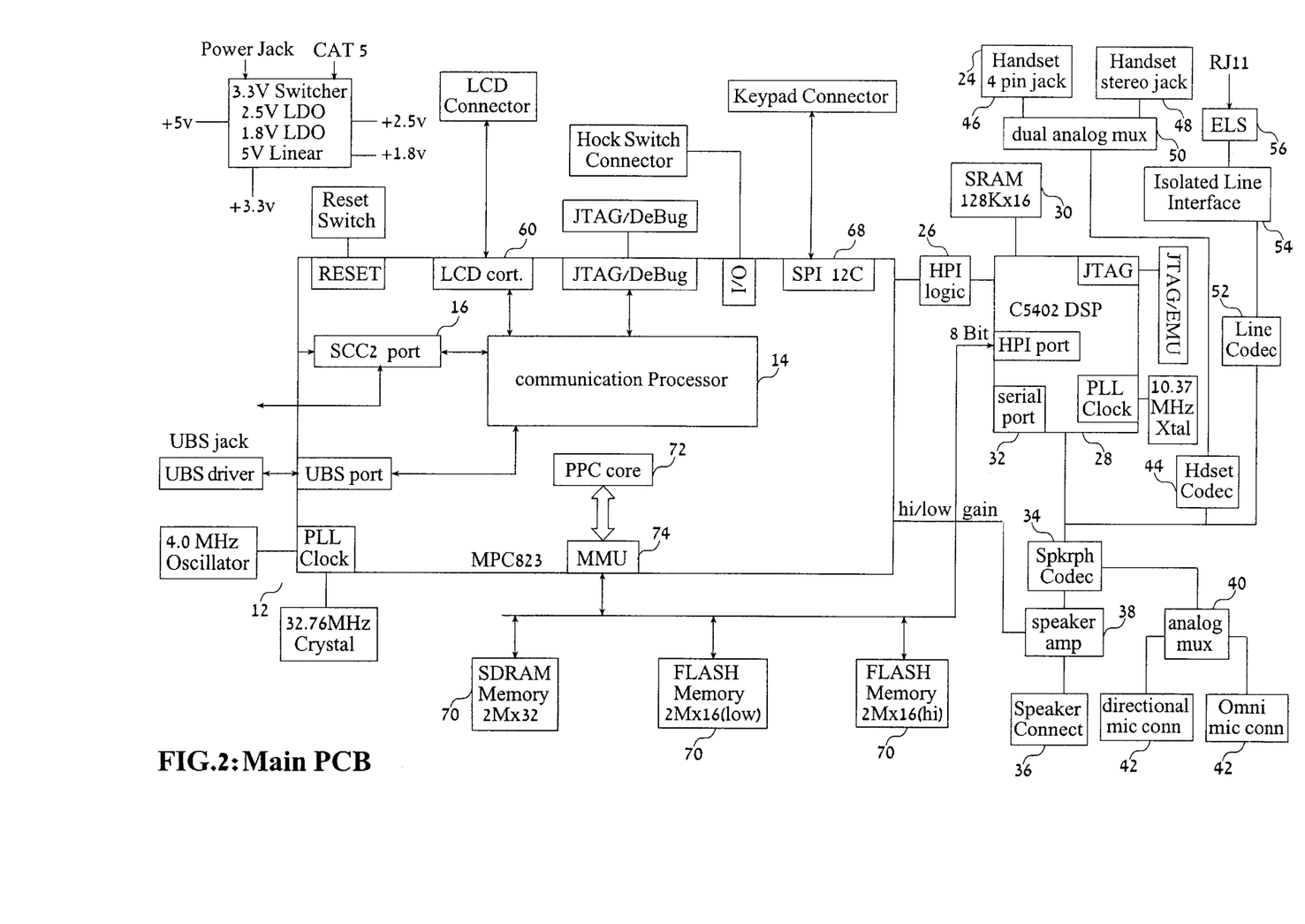
FIG. 2 is a schematic block diagram of a main printed circuit board.
Figure 3:
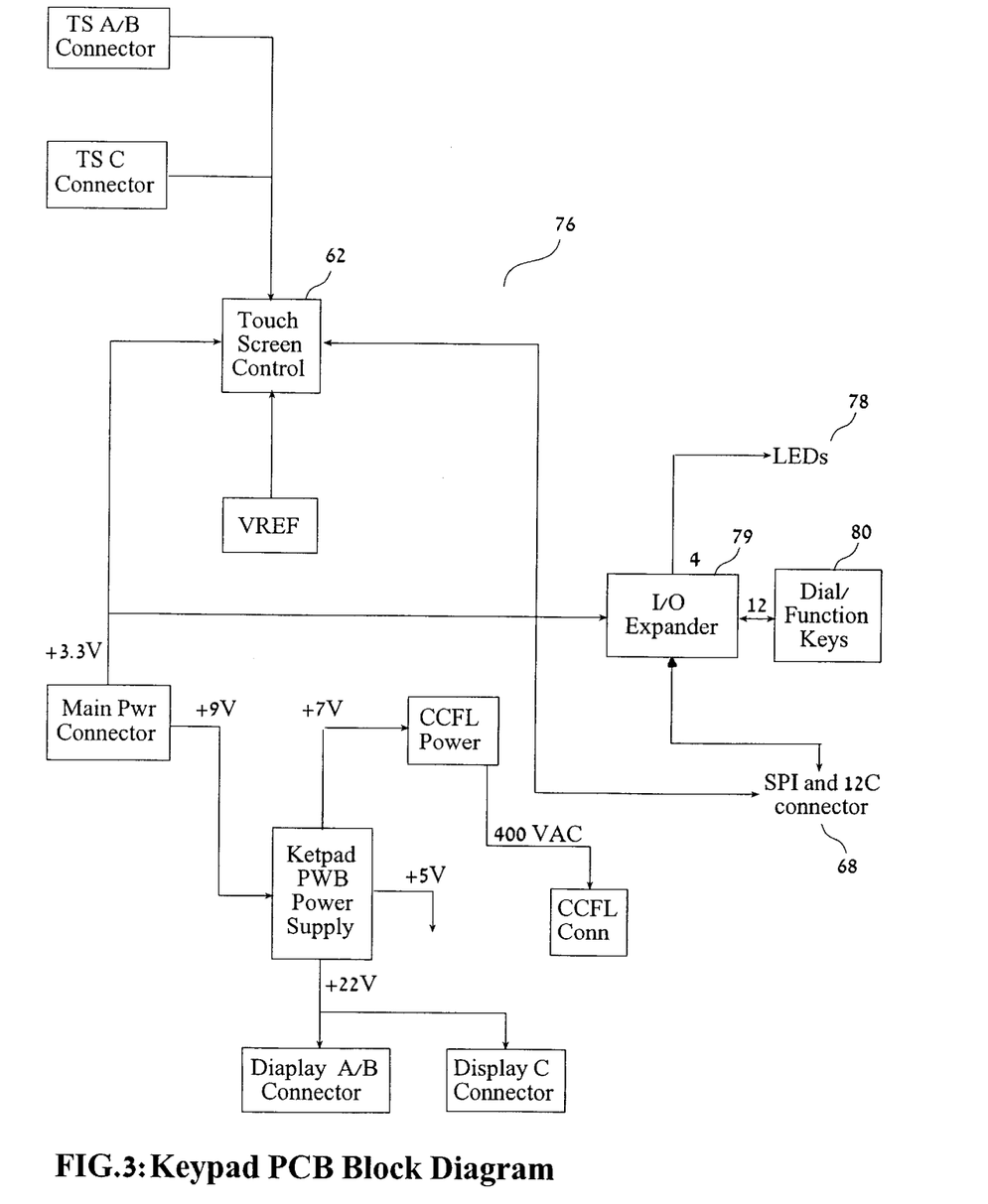
FIG. 3 is a schematic block diagram of a keypad printed circuit board.

FIGS. 2 and 3 are schematic block diagrams of a main printed circuit board (FIG. 2) and of a keypad printed circuit board (FIG. 3). As FIG. 2 essentially contains the same or similar components as FIG. 1, it will not be described in further detail here.

FIG. 3 shows a keypad printed circuit board (PCB) 76 for containing all of the connectors required to interface to touch screen 64 through touch screen controller 62, and to LED's 78 as shown. Keypad PCB 76 also provides a connection to dial or function keys 80, for example in order to enter the digits of a telephone number. I/O expander 79 mediates between the central processor, LED's 78 and function keys 80 as shown. This shows connections between keypad PCB 76 and the main PCB (not shown), as well as the power flow.

Figure 4:
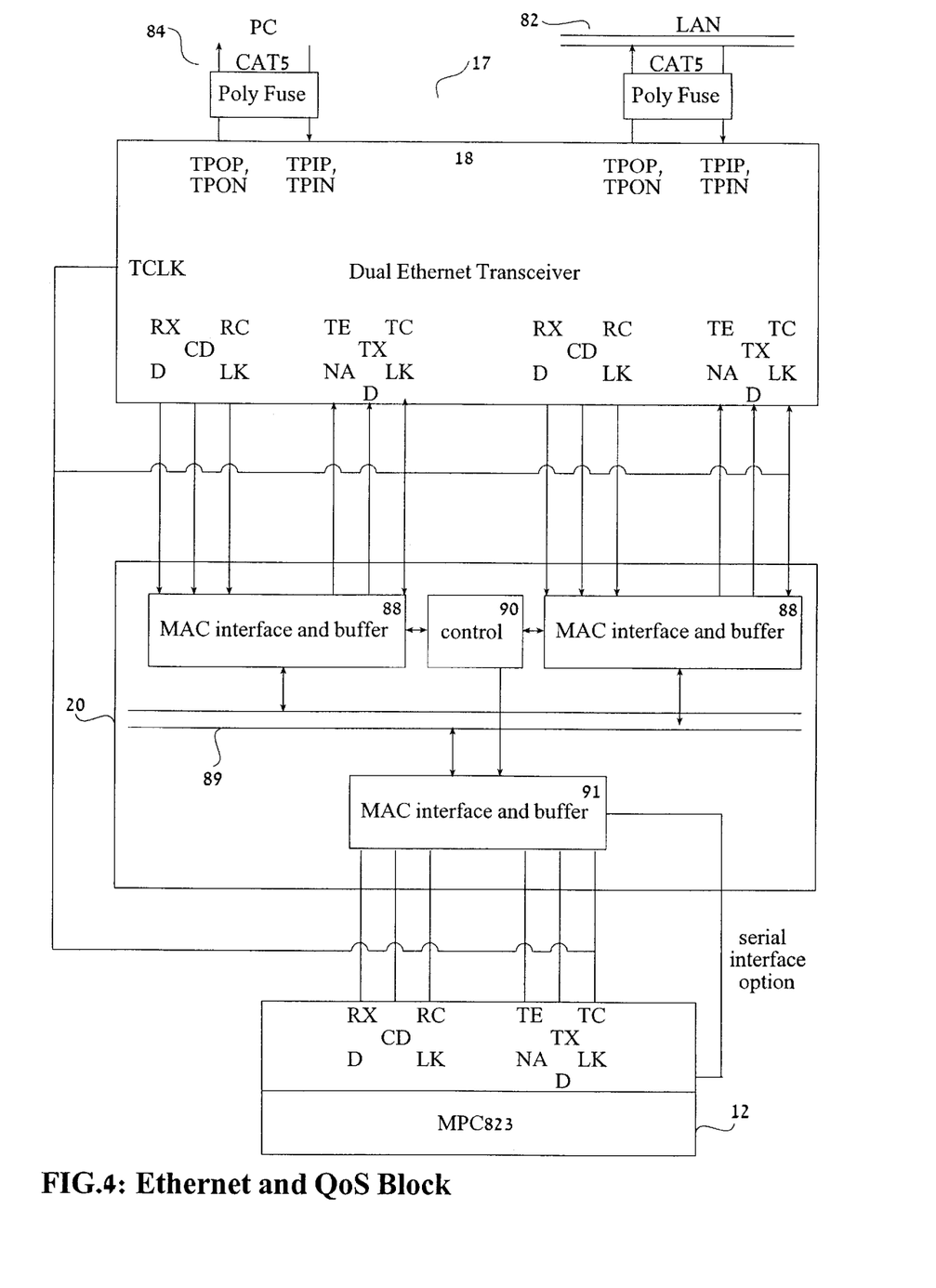
FIG. 4 is a more detailed schematic block diagram of a network connection device according to the present invention.

FIG. 4 is a more detailed schematic block diagram of network connection device 17 according to the preferred embodiment of providing an Ethernet connection. As shown, network connection device 17 provides a 10/100 BASE-T interface to both a LAN (local area network) 82 and a local computer 84. Preferably, both connections are provided through a dual Ethernet transceiver 18, which is more preferably an Enable dual high speed Transceiver/PHY. Alternatively, two Level One LXT970 units could provide such a physical interface.

Dual Ethernet transceiver 18 is connected to QOS module 20. QOS module 20 includes a plurality of MAC interfaces 88, 91 with incorporated buffers, which are controlled by a controller 90. A MAC interface may optionally follow a standard according to IEEE 802. This interface is responsible for moving packets between the connected devices and an internal bus 89, and is operating according to MAC layer protocols. In this implementation, each MAC interface 88 is connected to dual transceiver 86 at one end, and to internal bus 89 at the other end. A third MAC interface 91 is connected to central processing chip 12 (see FIG. 1 for more details) at one end, and to internal bus 89 at the other end. The action of MAC interfaces 88 and 91 is controlled by controller 90, which preferably gives preference to packets from central processing chip 12 over those from local computer 84 for ensuring high voice quality, thereby giving a higher priority to the transmission of voice packets over data packets.

Figure 5:
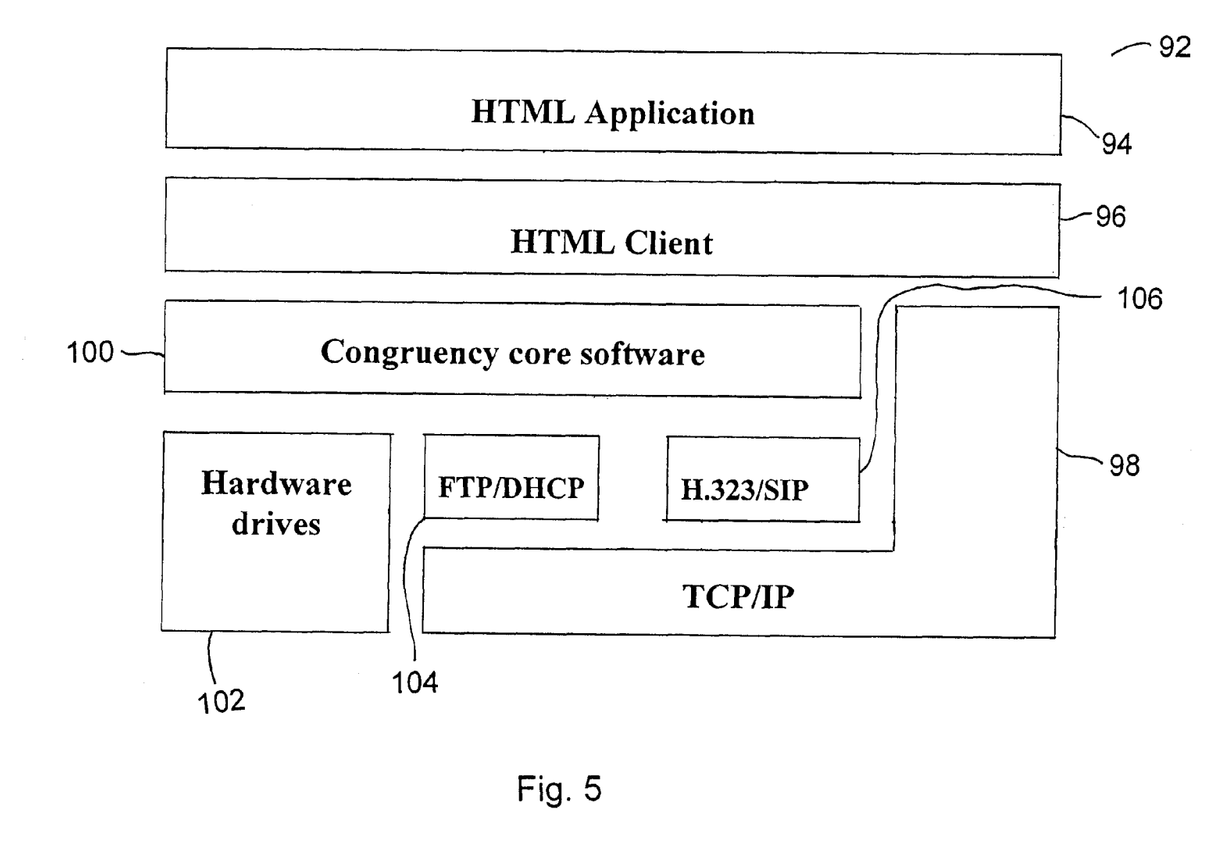
FIG. 5 is a schematic block diagram of a n exemplary software architecture according to the present invention.

FIG. 5 is a schematic block diagram of an exemplary software architecture 92 according to the present invention. As shown, software architecture 92 features an HTML application layer 94, which is the plurality of software scripts for customizing the functionality of the network telephonic device of the present invention. These scripts can be created and/or adjusted by the user in order to customize the functions of the network telephonic device. An HTML client 96, preferably HTML Works (Wind River Ltd., USA) for example, gives access to the scripts of HTML application layer 94 to a TCP/IP layer 98 and to a core software 100. TCP/IP layer 98 provides services for communication across the packet-switched network for the TCP/IP protocols, assuming that the network is a TCP/IP network.

Core software 100 performs a number of functions, including maintaining the state machines for telephone calls. Another function is controlling the start-up of the telephonic device, for example in order to receive its own network address from a DHCP (Dynamic Host Configuration Protocol) server. Core software 100 also provides access for the customized user scripts of HTML application layer 94 to all of the resources of the telephonic device, such as the various hardware components, as described in greater detail with regard to FIG. 6. Core software 100 controls these various hardware components through one of a plurality of hardware drivers 102 for each such hardware component.

Core software 100 provides access to network services through an FTP (File Transfer Protocol)/DHCP module 104 and through an H.323/SIP module 106 for network telephony communication services.

Figure 6:
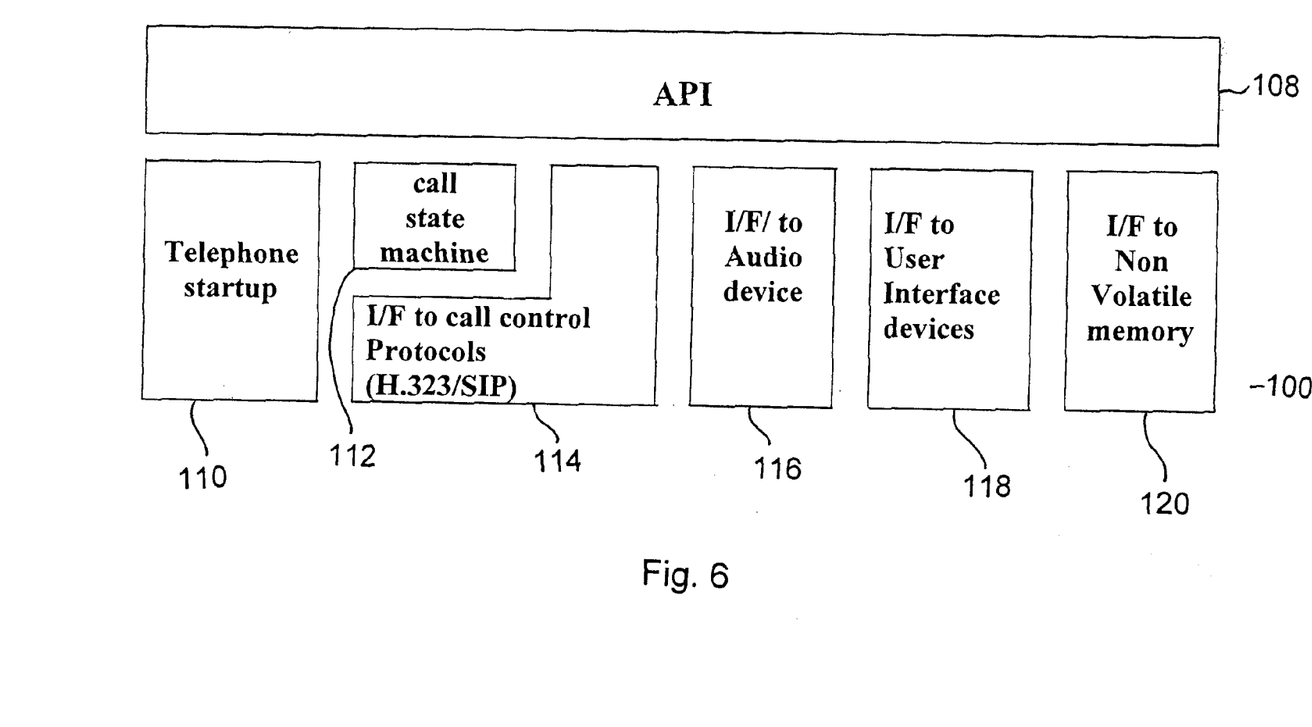
FIG. 6 shows a schematic block diagram of a software core according to the present invention.

FIG. 6 shows the architecture of core software 100 in more detail. Core software 100 features an API 108 for communicating with the remaining components of FIG. 5. API 108 is also in communication with a telephone start-up module 110, which as previously mentioned enables the telephonic device of the present invention to begin operation. A call state machines module 112 maintains the state machines for the telephone calls.

Interfaces to various software modules and hardware components of the telephonic device are also provided as follows. A call control protocol interface 114 interacts with H.323/SIP module 106 for performing communication according to network telephony protocols such as H.323 and SIP for example. An audio device interface 116 interacts with the audio devices of the network telephonic device, such as the headset, handset, speaker and microphone(s) of the telephonic device according to the present invention. Such interaction may optionally include, but is not limited to, the detection of dialing tones for an incoming telephone call, the generation of such tones for an outgoing telephone call, and handling streaming audio data.

A UI (user interface) interface 118 interacts with the various software and hardware components of the user interface of the network telephonic device, such as the touch screen, LCD display, the GUI (graphical user interface) shown on the LCD display, the keypad and the LED's.

A non-volatile memory interface 120 interacts with the non-volatile memory component(s) of the network telephonic device, for example for the storage and retrieval of configuration parameters.

The previous Figures described the network telephony device according to the type of hardware and software architectures which can be used to implement the device itself. This section describes the type of software functionality which is preferred for enabling the device to be flexible and easily customizable. Preferably, the following features are included: adding functions according to the request of the user; modifying the graphical look and feel of the visual display; modifying the operation of the clients; and creating a hot link between telephone calls and data.

For example, the telephonic device of the present invention is useful for placing telephone calls. The telephone number may optionally be entered through the keypad, or alternatively retrieved from memory through the GUI shown on the touch-sensitive display screen. The telephonic device can also receive calls, optionally while displaying information about the calling party on the display screen.

Optionally and preferably, the telephonic device can record messages for the user, for example if the user cannot receive an incoming telephone call. These messages can then be played back to the user.

The software functions include various features for controlling the components of the telephonic device, such as turning the speakers on or off, switching the sound to the headset or to the handset, and so forth. In addition, messages to the user can be displayed, concerning the functioning of the device itself, messages received from other callers for the user, and so forth.

It will be appreciated that the above descriptions are intended only to serve as examples, and that many other embodiments are possible within the spirit and the scope of the present invention.

What is claimed is:

1. A telephone system for providing telephonic services over a packet-switched network, the system comprising:
   (a) at least one network telephonic device for providing the telephonic services through the network, said at least one network telephonic device executing language based scripts for determining at least one function of said at least one network telephonic device; and
   (b) a server for serving said language based scripts to said at least one network telephonic device.

* * * * *

UNITED STATES PATENT AND TRADEMARK OFFICE
CERTIFICATE OF CORRECTION

PATENT NO.   : 6,711,244 B2
DATED        : March 23, 2004
INVENTOR(S)  : Hayon et al It is certified that error appears in the above-identified patent and that said Letters Patent is hereby corrected as shown below:

Title page,
Insert:
-- [73] Assignee: Telrad Connegy Ltd, Rosh A'ain (IL) --

Signed and Sealed this

Thirteenth Day of July, 2004

JON W. DUDAS
*Acting Director of the United States Patent and Trademark Office*